US012799250B2

(12) United States Patent
Minnici et al.

(10) Patent No.: US 12,799,250 B2
(45) Date of Patent: Nov. 17, 2026

(54) HEALABLE ACRYLIC POLYMERS

(71) Applicant: Trinseo Europe GmbH, Pfaeffikon (CH)

(72) Inventors: Krysten R. Minnici, West Chester, PA (US); Sangwoo Park, Wayne, PA (US); Jing-Han Wang, Blue Bell, PA (US)

(73) Assignee: Trinseo Europe GmbH, Pfaeffikon (CH)

( * ) Notice: Subject to any disclaimer, the term of this patent is extended or adjusted under 35 U.S.C. 154(b) by 578 days.

(21) Appl. No.: 18/556,955

(22) PCT Filed: Apr. 28, 2022

(86) PCT No.: PCT/US2022/026677
§ 371 (c)(1),
(2) Date: Oct. 24, 2023

(87) PCT Pub. No.: WO2022/232361
PCT Pub. Date: Nov. 3, 2022

(65) Prior Publication Data

US 2024/0199781 A1 Jun. 20, 2024

Related U.S. Application Data

(60) Provisional application No. 63/182,026, filed on Apr. 30, 2021, provisional application No. 63/182,031, filed on Apr. 30, 2021.

(51) Int. Cl.
*C08F 220/38* (2006.01)

(52) U.S. Cl.
CPC ...... *C08F 220/382* (2020.02); *C08F 220/385* (2020.02)

(58) Field of Classification Search
None
See application file for complete search history.

(56) References Cited

U.S. PATENT DOCUMENTS

2020/0216581 A1 7/2020 Suh et al.

FOREIGN PATENT DOCUMENTS

| | | |
|---|---|---|
| CN | 109666121 A | 4/2019 |
| CN | 111378160 A | 7/2020 |
| WO | 2018019977 A1 | 2/2018 |

OTHER PUBLICATIONS

Ji-kang, et al., "Commercial mercury lamps adapted to give a long-life source of ultraviolet radiation," J. Phys. E: Sci. Instrum. 19 (1986), 313. (Year: 1986).*

(Continued)

*Primary Examiner* — Fred M Teskin
(74) *Attorney, Agent, or Firm* — Buchanan Ingersoll & Rooney PC

(57) ABSTRACT

Poly(meth)acrylate formulations include acrylic copolymers having acrylic monomer units including xanthate, thiocarbonylthio, disulfide, or dithioester functionality. The acrylic copolymers can be blended with poly(meth)acrylate resins to provide a blended composition having a healable property. The xanthate, thiocarbonylthio, disulfide, or dithioester functionality can be activated by the addition of energy, such as heat, or radiation, to remove marring from the surface of a coating, film, or sheet.

13 Claims, 3 Drawing Sheets

(56) References Cited

OTHER PUBLICATIONS

Office Action (Communication pursuant to Article 94(3) (EPC) issued Sep. 25, 2025, by the European Patent Office in corresponding European Patent Application No. 22 732 693.1-1102. (7 pages).
International Search Report and Written Opinion for International Application No. PCT/US2022/026677, dated Aug. 8, 2022, 11 pages.
Amamoto et al., "Repeatable Photoinduced Self-Healing of Covalently Cross-Linked Polymers through Reshuffling of Trithiocarbonate Units", Angewandte Chemie International Edition, Jan. 10, 2011, vol. 50, No. 7, pp. 1660-1663.
An et al., "Recent strategies to develop self-healable crosslinked polymeric networks", Chemical Communications, Jan. 1, 2015, vol. 51, pp. 13058-13070.
Le Neindre et al., "One-pot deprotection and functionalization of polythiol copolymers via six different thiol-X reactions: One-pot deprotection and functionalization", Polymer International, Dec. 18, 2013, vol. 63, No. 5, pp. 887-893.
Nicolay et al, "Responsive Gels Based on a Dynamic Covalent Trithiocarbonate Cross-Linker", Macromolecules, Apr. 15, 2010, vol. 43, No. 9, pp. 4355-4361.
Takahashi et al., "Thermally Healable and Reprocessable Bis (hindered amino) disulfide-Cross-Linked Polymethacrylate Networks", ACS Macro Letters, Nov. 1, 2017, vol. 6, No. 11, pp. 1280-1284.

* cited by examiner

HEALABLE ACRYLIC POLYMERS

CROSS REFERENCE TO RELATED APPLICATIONS

This is the U.S. National Phase Application of International Application No. PCT/US2022/026677 filed Apr. 28, 2022 which is related to and claims priority from U.S. Provisional Application Ser. No. 63/182,026, filed Apr. 30, 2021, and U.S. Provisional Application Ser. No. 63/182,031, filed Apr. 30, 2021, both of which are incorporated by reference herein in their entireties for all purposes.

FIELD OF THE INVENTION

The invention relates to novel healable copolymers having xanthate, thiocarbonylthio, disulfide, or dithioester functionality. The invention also relates to healable poly(meth) acrylate formulations including the novel copolymers.

BACKGROUND OF THE INVENTION

Metal structures rust without a protective coating layer. The protective coating layer can become damaged by environmental forces, resulting in scratching, and other marring. When the scratch or mar breaks through the surface protective coating, the unprotected metal can rust.

An alternative to metal structures and articles are plastics. However, many plastics will deteriorate from exposure to environmental forces. One common method to protect a structural plastic is to cover the base plastic with a thin layer of an environmentally stable polymer, such a SOLARKOTE™ acrylic capstock, from Trinseo.

While a capstock is resistant to environmental forces, it can still scratch and mar, creating marks and blemishes in the surface of the polymer.

It is desirable to have a polymeric surface layer or coating that is healable—meaning that any scratch of mar could be returned to its original, or near-original condition. There are examples in the art of healable polymers. For example, US2020/216581 A1 describes the use of a urethane, urea or amide group capable of healing.

Reverlink® polymer from Arkema provides a healable composition using a supramolecular polymer structure, where reversible hydrogen bonds are provided to heal marring.

There is a need for a practical additive that can be used as is, or be blended with a (meth)acrylic polymer and in which the healable property can be activated to heal any scratches or marring. This additive solution should meet the criteria of providing healable properties when added at low level, with little or no effect on the material properties of the bulk polymer.

SUMMARY OF THE INVENTION

In an embodiment, a copolymer having xanthate, thiocarbonylthio, disulfide or dithioester functional acrylate monomer units is disclosed. The functional acrylate monomer units may be selected from trithiocarbonate (TTC)-acrylate; or 2,2,6,6-tetramethyl piperdine-1-sulfanyl (TEMPS)-acrylate, a disulfide containing comonomer, a dithioester containing comonomer, a dithiocarbamate containing comonomer, or a xanthate containing comonomer. The functional acrylate monomers may be copolymerized with other vinyl monomers, and in particular with methyl (meth)acrylate and optionally other (meth)acrylates. The thio functional acrylate monomer units make up from 0.01 to 30 wt. %, preferably from 0.1 to 20 wt. %, and most preferably from 0.5 to 5 wt. % of the total copolymer. According to some embodiments, the thio functional acrylate monomers may have more than one ethylenically polymerizable group. For example, the functional monomer may include two or more acrylate groups or one acrylate group and a vinyl group in addition to the thio-functional group. In particular, the disulfide or dithioester functional acrylate monomer units provide S—S bonds, or in the case of trithiocarbonate (TTC), S—C bonds, that break and reform upon exposure to radiation, to impart a healable property to the copolymer or a blend thereof.

The other vinyl monomers in the copolymer can be any monomer having ethylenically unsaturated carbon bonds, and especially one or more of the following monomers: (meth)acrylates, styrene, alpha methyl styrene, acrylonitrile, olefins such as ethylene, propylene, butylene, vinyl chloride, vinyl acetate, vinyl esters, vinyl ethers, butadiene, chloroprene, isoprene, and mixtures thereof. Methyl methacrylate monomer units and the vinyl monomers are especially preferred, with C1-C8 acrylic monomers included for terpolymers.

According to another embodiment, the inventors have found that by adding low levels of the thio functional acrylic copolymer into a (meth) acrylic polymer or other vinyl polymer, a healable composition may be produced. The healing of the healable composition after (for example) damage to a surface of the composition can be activated by heat or radiation, to return the composition surface to near-new condition.

Vinyl polymers are a broad class of polymers that are used in a wide range of applications. The addition of functionality to vinyl polymers provides sites for cross-linking and further chemical reactions. It should be understood that these "vinyl" polymers that may be blended with the copolymer do not include the thio-functionality that provides the healable property, but may include other functional groups.

Embodiments of the invention also relate to a healable acrylic composition comprising the copolymer having xanthate, thiocarbonylthio, disulfide or dithioester functional acrylate monomer units at from 0.1 to 100 wt. %, preferably from 20 to 90 wt. % and most preferably from 50 to 80 wt. %, based on the total weight of polymers in the composition. For example, the composition may be a blend of the copolymer having xanthate, thiocarbonylthio, disulfide or dithioester functional acrylate monomer units with (meth) acrylic polymers, such as polymethy methacrylate copolymers.

The healable polymer composition of the invention may further contain one or more additives at amounts known in the art, including, but not limited to impact modifiers; stabilizers; plasticizers; fillers; diluents; tackifiers; coloring agents; pigments; antioxidants; antistatic agents; surfactants; toner; refractive index matching additives; additives with specific light diffraction, light absorbing, or light reflection characteristics; dispersing aids; and the like.

The invention also relates to a process for providing healable (meth)acrylic articles, comprising the steps of:

a) Forming an article, a profile, a film, a sheet, or a coating comprising the thio-functional copolymer,
b) Exposing the surface of the article, profile, sheet or coating to environmental forces, leaving marring and/or scratching on a surface of the article, profile, sheet or coating,
c) Exposing said surface to radiation for an effective period of time to allow S—S and/or S—C bonds in the thio-functional copolymer to break and reform, thereby healing the surface marring and/or scratching. The radiation is heat, UV, visible, gamma radiation, or electron beam radiation supplied by a known source, such as from a Hg lamp or LED's. According to some embodiment, the radiation may be ambient as well, such as sunlight.

The healable composition of the invention is useful in any application in which marring and/or scratching of a surface occur. Some exemplary examples include a coated metal or plastic; a head light; mold-in color (MIC) parts; a capstock; a door; a window; an automotive part; internal and exterior paneling; automotive body panels; auto body trim; recreational vehicle body panels or trims; exterior panels for recreational sporting equipment, marine equipment, exterior panels for outdoor lawn, garden and agricultural equipment; exterior paneling for marine; aerospace structures; aircraft; public transportation applications; interior paneling applications; interior automotive trims; interior panels for marine equipment; interior panels for aerospace and aircraft; interior panels for public transportation applications; paneling for appliances; furniture; or cabinets.

DETAILED DESCRIPTION OF THE INVENTION

Figure 1:
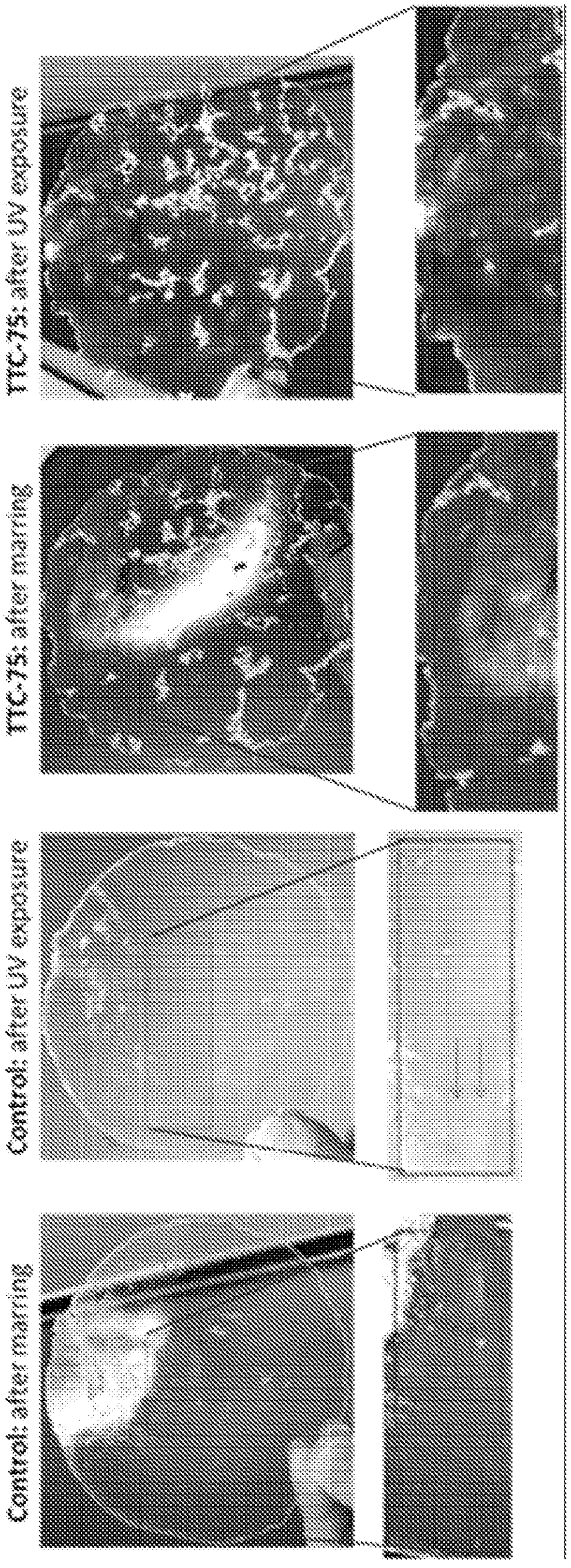
FIG. 1 shows healable behavior of a 0.75 wt. % TTC-acrylate copolymer.

"Copolymer" is used to mean a polymer having two or more different monomer units, including copolymers, and polymers with three or more different monomers, such as terpolymers and tetrapolymers. "Polymer" is used to mean both homopolymer and copolymers. Polymers may be straight chain, branched, star, comb, block, or any other structure. The polymers may be homogeneous, heterogeneous, and may have a gradient distribution of co-monomer units.

All references cited are incorporated herein by reference. As used herein, unless otherwise described, percent shall mean weight percent. Molecular weight is a weight average molecular weight as measured by GPC using PMMA standards. In cases where the polymer contains some cross-linking, and GPC cannot be applied due to an insoluble polymer fraction, soluble fraction/gel fraction or soluble faction molecular weight after extraction from gel is used and reported as the weight average molecular weight of the crosslinked polymer. Unless stated otherwise, acetone is used as the extraction solvent, if such a solvent is necessary.

By "(meth)acrylic" or "(meth)acrylate" as used herein denotes both the acrylate and the methacrylate. (Meth) acrylate is used to connote both acrylates and methacrylates, as well as mixtures of these. Polymers may be straight chain, branched, star, comb, block, or any other structure.

"Healable" as used herein means that the polymer or blend is able to repair physical damage such as mars or scratches. "Healing" occurs by breaking and rejoining S—S and/or S—C bonds in the polymer or blend in response to an external stimulus, such as infrared, heat, UV, visible light, x-ray radiation, gamma radiation, or electron beam radiation to effect the healing process of the physical damage and the breaking and rejoining of the S—S and/or S—C bonds.

"Marring" as used herein means to inflict an imperfection, mark, or blemish on a surface, causing a "mar" visible to an unaided human eye.

"Scratching" as used herein means to score or mark the surface of (something) with a sharp or pointed object, causing a "scratch" visible to an unaided human eye.

As used herein, the terms "vinyl" and "ethylenically unsaturated" are understood to mean compounds including at least one C═C double bond capable of free-radical polymerization.

It should be understood that the S—S or S—C bonds that break and reform are those imparted by the thio-functional monomer in the copolymer.

According to an embodiment, the invention relates to the incorporation of the special disulfide or dithioester functional acrylic copolymers into a (meth)acrylic polymer composition, to provide healable properties to the polymer composition when activated by heat or radiation. The invention also relates to thiocarbonylthio-functional vinyl copolymers formed by the reaction of trithiocarbonate-acrylate and/or 2,2,6,6-tetramethyl piperdine-1-sulfanyl-acrylate functional monomers with one or more other vinyl monomers. The resulting copolymer can then be cross-linked or further reacted at the thiocarbonylthio functionality.

Thiocarbonylthio-Functional Acrylic Monomer

As used herein, "thiocarbonylthio" is used to represent the structure:

R1-S—C(═S)—R2. When R2 is "S—R3", it is trithiocarbonate. When R2 is "O—R4", it is xanthate.

When R2 is "alkyl" or "aryl", it is commonly called dithioester. When R2 is "N—R5", it is dithiocarbamate Thiocarbonylthio and multi-sulfide functional acrylic monomers may be obtained by the reaction of a thiocarbonylthio-containing reactant with a (meth)acrylate monomer. The complex multifunctional acrylic monomers of the invention are trithiocarbonate (TTC)-acrylate, and multi-functional 2,2,6,6-tetramethyl piperdine-1-sulfanyl (TEMPS) acrylate. One synthesis route to produce the TTC-acrylate is shown below:

Trithiocarbonate (TTC) can be reacted with glycidyl methacrylate as follows, to form a TTC-diacrylate monomer:

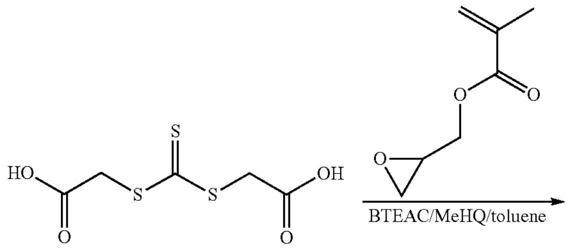

-continued

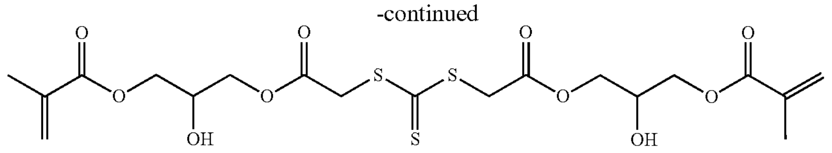

The thiocarbonylthio functional acrylate monomers may be present in the copolymer of the invention at from 0.01 to 30 wt. %, preferably 0.1 to 20 wt. %, and more preferably from 0.5 to 5 wt. %, based on the weight of the copolymer.

Vinyl Monomers

The specialty thio-functional acrylic monomers of the invention may then be reacted with other vinyl monomers to form copolymers contain thio functionality. The level of functionalization can be controlled by the amounts and timing of the monomer additions. Preferred copolymers are crosslinked random copolymers. However, by adjusting the reaction temperature and rate/timing of monomer addition, many different architectures are possible, including, for example, random, tapered star, comb, and blocky.

By "vinyl" monomers is meant any monomer having ethylenically unsaturated bonding, that is capable of reacting with the functional acrylic monomer to form a copolymer. The reaction of the monomers will generally occur by radical initiation, i.e. free-radical polymerization.

Examples of vinyl monomers include, but are not limited to (meth)acrylates styrene, alpha methyl styrene, acrylonitrile, olefins such as ethylene, propylene, butylene, vinyl chloride, vinyl acetate, vinyl esters, vinyl ethers, butadiene, chloroprene, isoprene, and mixtures thereof.

In a preferred embodiment, the vinyl monomer is one or more of (meth)acrylates, and a preferred (meth)acrylate monomer is methyl methacrylate, Methyl methacrylate preferably makes up at least 51 wt. % of the vinyl monomers in the copolymer, preferably at least 65 wt. %, and most preferably at least 80 wt. % of the vinyl monomers.

Non-limiting examples of suitable acrylic monomers are methyl acrylate, ethyl acrylate, ethyl methacrylate, butyl acrylate, butyl methacrylate, iso-octyl methacrylate, iso-octyl acrylate, lauryl acrylate, lauryl methacrylate, stearyl acrylate, stearyl methacrylate, isobornyl acrylate, isobornyl methacrylate, methoxy ethyl acrylate, methoxy methacrylate, 2-ethoxy ethyl acrylate, 2-ethoxy ethyl methacrylate, dimethylamino ethyl acrylate, or dimethylamino ethyl methacrylate monomers. Alkyl (meth) acrylic acids such as methacrylic acid and acrylic acid can be useful for the monomer mixture.

According to some embodiments, the xanthate, thiocarbonylthio, disulfide, or dithioester-functional acrylic copolymers of the invention are the reaction product of special di- or multi-functional acrylate monomers, with (meth)acrylic monomers. If present, the level of the di- or multi-functional acrylate monomer units in the functional copolymer is in the range of from 0.01 to 30, preferably from 0.1 to 20, and most preferably from 0.5 to 5 wt. % of the total copolymer.

According to some embodiments, the xanthate, thiocarbonylthio, disulfide, or dithioester functional acrylic monomers in the copolymer of the invention may comprise trithiocarbonate (TTC) acrylate, dithiocarbamate acrylate, dithioester acrylate, and xanthate acrylate, and multifunctional 2,2,6,6-tetramethyl piperidine-1-sulfanyl (TEMPS) acrylate.

Preferably the one or more (meth)acrylic monomers includes methyl methacrylate at a level of 51 to 100 wt. %, preferably at least 65 to 99 wt. %, and most preferably at least 80 to 98 wt. %, based on the total amount of all (meth)acrylic monomers.

In addition to methyl methacrylate, other (meth)acrylic monomers may also be present in the (meth)acrylic monomer mixture at 1 to 35 wt. % and preferably from 2 to 20 wt. %, based on the total (meth)acrylic monomers. Useful other (meth)acrylic monomers include, but are not limited to methyl acrylate, ethyl acrylate, ethyl methacrylate, butyl acrylate, butyl methacrylate, iso-octyl methacrylate, iso-octyl acrylate, lauryl acrylate and lauryl methacrylate, stearyl acrylate and stearyl methacrylate, isobornyl acrylate, isobornyl methacrylate, methoxy ethyl acrylate, methoxy methacrylate, 2-ethoxy ethyl acrylate, 2-ethoxy ethyl methacrylate, dimethylamino ethyl acrylate, dimethylamino ethyl methacrylate monomers. Alkyl (meth) acrylic acids such as methacrylic acid and acrylic acid can be useful for the monomer mixture.

Polymerization

The xanthate, thiocarbonylthio, disulfide, or dithioester functional acrylate monomer units together with the other comonomers are preferably polymerized by radical polymerization using a typical polymerization method, such as bulk polymerization, emulsion polymerization, inverse emulsion polymerization, and solution polymerization. In a preferred embodiment, bulk polymerization is used. Polymerization conditions can be optimized to vary the percentage of the xanthate, thiocarbonylthio, disulfide or dithioester functional acrylate monomer units in the resulting copolymer.

Acrylic Polymers in Blends with the Thio-Functional Copolymer

The thiocarbonylthio, disulfide, xanthate, or dithioester functional acrylic copolymer may be used by itself, or may optionally be blended with one or more (meth)acrylic polymers to form a healable acrylic polymer composition.

In a preferred embodiment, the optional (meth)acrylic polymer of the blended polymer composition contains from 65 to 100 wt. %, preferably from 75 to 99.5 wt. % and most preferably from 85 to 99 wt. % of methyl methacrylate monomer units, and from 0 to 35 wt. %, preferably 0.5 to 25 wt. %, and most preferably from 1 to 15 wt. % of other (meth)acrylate monomers. In a preferred embodiment, the acrylic polymer contains from 0.1 to 10 wt. % of a C1-6 acrylate monomer units. Other monomers, including acrylic acid and methacrylic acid, and other non-acrylic monomers polymerizable with methyl methacrylate can be present at levels up to 20 wt. %, and preferably up to 10 wt. %, based on the total weight of the acrylic polymer.

Photoinitiator

While not required for the composition of the invention, in a preferred embodiment, a photoinitiator is added to improve the healable properties, and the photoinitiator (if present) is then activated with radiant energy. The amount of photoinitiator is not considered to be critical, but may be varied as may be appropriate depending upon the photoinitiator(s) selected, and the amount of xanthate, thiocarbonylthio, disulfide, or dithioester functional groups present in the composition, the radiation source, and the radiation conditions used, among other factors. Typically, however, the amount of photoinitiator may be from 0.05% to 5% by weight, based on the total weight of the composition.

Non-limiting examples of the photoinitiator) are α-hydroxyketones, phenylglyoxylates, benzyldimethylketals, α-aminoketones, mono-acyl phosphines, bis-acyl phosphines, phosphine oxides, metallocenes, and combinations thereof. In particular embodiments, the at least one photoinitiator may be 1-hydroxy-cyclohexyl-phenyl-ketone and/or 2-hydroxy-2-methyl-1-phenyl-1-propanone.

In certain embodiments of the invention, the compositions described herein do not include any photoinitiator and are healable with electron beam energy.

Additives

The copolymer having xanthate, thiocarbonylthio, disulfide, or dithioester-functional monomer units may be blended with typical additives used in the polymer industry, to form a copolymer composition. Typical additives include, but are not limited to impact modifiers; stabilizers; plasticizers; fillers; coloring agents; pigments; antioxidants; antistatic agents; surfactants; toner; refractive index matching additives; additives with specific light diffraction, light absorbing, or light reflection characteristics; or dispersing aids.

Blending Procedure

The xanthate, thiocarbonylthio, disulfide, or dithioester-functional copolymer composition of the invention may be blended with compatible polymers, to provide a functional polymer blend for further reaction, including cross-linking of the copolymer blend. The xanthate, thiocarbonylthio, disulfide, or dithioester functional copolymer may also be used by itself, without blending with other polymers, and may be used as a healable material.

The xanthate, thiocarbonylthio, disulfide, or dithioester functional acrylate copolymer may be used by itself, or may be blended into PMMA homopolymer or copolymer. Optional blending with (meth)acrylic polymer provides a simple means to control the level of healable thio functionality in a final acrylic composition The xanthate thiocarbonylthio, disulfide, or dithioester-functional acrylic copolymer may be added at from 0.1 to 100 wt. %, preferably from 20 to 90 wt. % and most preferably from 50 to 80 wt. % to another polymer, based on the total weight of polymers in the composition.

The blending of the xanthate, thiocarbonylthio, disulfide, or dithioester-functional acrylic copolymer with the bulk polymer may be done by any means known in the art. For example, the resins may be dry blended before processing, or may be blended together in the melt in the processing equipment.

Process for Healing

The process for healing of a polymer surface or coating involves the following steps:

First, the xanthate, thiocarbonylthio, disulfide or dithioester functional-functional acrylic copolymer is obtained, and optionally blended with polymethyl methacrylate homopolymer or copolymer, and/or other additives to form a healable acrylic composition Second, the healable acrylic composition is then processed, to form an article, a profile, a film, a sheet or a coating.

Third, the surface of the polymer blend article or coating is then exposed to environmental forces, leaving marring and scratching.

Finally, the marred surface is then exposed to radiation—such as heat, UV, or electron beam for example, from appropriate sources, such as Hg lamps or LED's—for an effective period of time to allow the S—S and/or S—C bonds to break and reform, thereby healing the surface marring.

Uses

The healable acrylic composition of the invention may be used as a coating, thin surface layer, capstock, or in the bulk of an article or profile. The composition may be used as a healable surface, replacing a painted or coated surface.

In one application, the composition is used to form mold-in color (MIC) parts.

In another application, a capstock or film of the healable polymethyl methacrylate (PMMA) composition is placed over a substrate by direct coextrusion, lamination, or through the use of a tie layer or adhesive.

In another application, an automobile headlight is made of, or coated with the healable acrylic composition, and after exposure to environmental forces that cause marring, the clarity of the headlamp is restored by exposure to UV or e-beam radiation.

Other uses include any parts that are prone to scratching and marring, such as: internal or exterior paneling; automotive body panels; auto body trim; recreational vehicle body panels or trims; exterior panels for recreational sporting equipment; marine equipment; exterior panels for outdoor lawn, garden or agricultural equipment; exterior paneling for marine, aerospace structures, aircraft, public transportation applications; interior paneling applications; interior automotive trims; interior panels for marine equipment; interior panels for aerospace or aircraft; interior panels for public transportation applications; or paneling for appliances, furniture, or cabinets.

In one preferred embodiment, since the composition of the invention can be clear, it may be used as an optical coating or article for lenses and light coverings.

EXAMPLES

Differential scanning calorimetry (DSC): The glass transition temperatures of acrylic polymers were measured at a heating rate of 10° C./minute in $N_2$ using TA instruments Q2000 DSC, during the second heating. The first heating was used to heat the sample to 150° C. at a heating rate of 10° C./minute, then the sample was cooled down to −75° C. at a cooling rate of 10° C./minute. The sample weight was controlled at 5-10 mg.

Dynamic mechanical analysis (DMA): Oscillatory temperature ramps and frequency sweeps were performed on thio functional PMMA copolymer healable samples. Dynamic (rotational) frequency sweep tests are generated at 230° C. by using an Anton Paar MCR500 rheometer with 25 mm parallel plates and 1 mm gap. The strain amplitudes was within the linear viscoelastic region. Frequency sweep tests were performed at the shear rates of 0.1 rad/s-500 rad/s. Temperature ramps were performed from 230° C. to ambient temperature (23-25° C.) and back from ambient temperature to 230° C. to evaluate reversibility.

YI (Yellowness Index), ΔE: Color measurements were done in transmission mode using CIE L*a*b*color space on an X-Rite Color 17 spectrophotometer.

Haze/Light Transmission

Total light transmission (TLT): The total light transmission was measured from film and/or plaque samples was measured using a BYK HazeGard Plus according to ASTM method D1003-21.

Haze: Optical haze of clear film and/or plaque samples was measured using BYK HazeGard Plus according to ASTM method D1003-21.

Rockwell Hardness Rockwell hardness measurements were done on the Wilson/Rockwell Hardness Tester Series 500 according to ASTM method D785-08.

Sample Preparation:

Thin films (0.03 in thickness) and plaques (0.06 in thickness) were prepared by compression molding. Conditions for the compositions are summarized below:

PMMA control: 428° F. (220° C.), 6 tons, 3 minutes

TTC-acrylate: 500° F. (260° C.), 6 tons, 3 minutes

Healing Property Testing:

Healing property testing was done via Dynamic Mechanical Analysis (DMA) to determine reversibility. Loss modulus, storage modulus, and complex viscosity were analyzed as a function of angular frequency at 230° C. from both temperature ramp up and down. A direct overlap in these values would point in the direction of reversibility, indicating likely self-healing behavior. This was exhibited by TTC-acrylate loadings of 0.25 wt. %, 0.5 wt. %, and 0.75 wt. %.

Healing testing was done by damaging the sample's surface with a crockmeter using 2 micron (aqua, aluminum oxide microparticles) polishing cloths for 100 cycles. Healing was recorded when the marring was no longer visible on the surface. In order to initiate healing on the surface, both heat and UV methods were used. Possible UV exposure methods include UV curing conveyor belt (UVEXS Conveyor Fusion Curing Unit Model CCU), UV light curing lamp, and QUVA lamps.

Example 1

Bulk polymerization was conducted with various thio-functional comonomer loadings of TTC-acrylate using Luperox® 11M75 as the initiator. All polymerizations were done using a water bath heated to 61° C. for an overnight reaction. For successful polymerizations, a curing step (120° C., ~2 hours) was completed the following day. Polymers were removed from the vial using a clamp. The polymer was then ground in a Thomas Mill granulator to produce resins for compression molding.

Bulk polymerizations were done with methyl methacrylate (MMA) and various thio-functional monomer loadings, which are summarized in Table 1.

TABLE 1

Experimental summary for comonomer bulk polymerizations with MMA

| Sample | Target thio functional comonomer loading | Actual comonomer loading | Comonomer | MMA |
|---|---|---|---|---|
| 1 | 0.25% TTC-acrylate | 0.26% | 0.066 g | 25.03 g |
| 2 | 0.50% TTC-acrylate | 0.55% | 0.1385 g | 25.14 g |
| 3 | 0.75% TTC-acrylate | 0.82% | 0.2072 g | 25.07 g |
| 4 | 1% - TTC-acrylate | 1.03% | 0.259 g | 24.8 g |
| 5 | 5% - TTC-acrylate | 5.06% | 1.27 g | 23.9 g |
| 6 | 8% - TTC-acrylate | 8.16% | 0.8232 g | 9.27 g |
| 7 | 10% - TTC-acrylate | 9.95% | 1.0058 g | 9.1 g |
| 8 | 15% - TTC-acrylate | 14.94% | 1.5013 g | 8.55 g |
| 9 | 20% - TTC-acrylate | 19.53% | 2.0193 g | 8.32 g |

Optical and Mechanical Properties:

Using 0.06 in thick plaques, optical and mechanical properties are summarized in Table 1 for TTC-acrylate copolymer. Total light transmission (TLT), haze, and hardness were molding dependent. In general, hardness increased with increase in wt. % thio-functional comonomer, with a few exceptions that could be attributed to poor molding. YI and ΔE also increased with wt. % thio-functional comonomer.

TABLE 1

Optical and mechanical properties of varying loadings of TTC-acrylate with acrylic copolymer

| wt. % TTC-acrylate | YI | ΔE | TLT | Haze | Hardness |
|---|---|---|---|---|---|
| 0% | 0.845 | — | 91.7 ± 5.30 | 5.31 ± 0.99 | 74.1 ± 0.9 |
| 0.25% | 4.34 | 2.05 | 91.7 ± 0.35 | 6.22 ± 0.79 | 71.7 ± 2.5 |
| 0.5% | 5.16 | 2.74 | 91.0 ± 0.35 | 7.67 ± 2.00 | 79.5 ± 2.5 |
| 0.75% | 7.34 | 4.16 | 89.7 ± 0.55 | 9.53 ± 1.20 | 83.3 ± 2.1 |
| 1% | 9.22 | 5.49 | 89.9 ± 0.57 | 8.94 ± 0.66 | 79.8 ± 2.1 |

Healing testing was demonstrated for 0.75 wt. % TTC-acrylate copolymer, using two methods of UV exposure (UV conveyor belt and UV curing lamp). Further verification was provided using photoinitiators (Irgacure® 1173), which also improved healing efficiency from 6 hour to 1 hour exposure time. Rheology studies demonstrated that injection molding is feasible and extrusion was demonstrated using control samples. Table 2 summarizes preliminary properties to compare 0.75 wt. % TTC-acrylate copolymer to a commercial polymer acrylic polymer (Trinseo Plexiglas®V825).

TABLE 2

Summary of properties comparing commercial acrylic copolymer and 0.75 wt. % TTC-acrylate/PMMA

| Property | Commercial acrylic copolymer | 0.75 wt. % TTC-acrylic copolymer |
|---|---|---|
| Tg | 115° C. | 113.7° C. |
| Rockwell Hardness | 93M | 83.3M |
| YI | <2 | 7.34 |
| ΔE | N/A | 4.16 |
| Haze | 0.43 | 9.53 |
| TLT | 93.3 | 89.7 |

DMA was used as a tool to determine reversibility of the healing property. The DMA results confirmed reversibility for 0.25 wt. %, 0.5 wt. %, and 0.75 wt. % TTC-acrylate samples. YI and ΔE increased with increases in thio functional comonomer content. No additives were included in these formulations, but could optionally be added to improve YI and color values. Haze/light transmittance do not appear to change with the addition of thio functional comonomer.

Example 2

Initial healing properties were demonstrated for TTC-acrylate copolymer at 0.75 wt. % thio functional comonomer loading and is shown in FIG. 1. A thin film (0.03 in thickness) was marred using the crockmeter with 2 micron (aqua, aluminum oxide microparticles) polishing cloths for 100 cycles. To initiate healing, the thin films were placed under a UV light curing lamp at a distance of 2.75 inches from the light source to allow for UV exposure without warping the sample. Testing to compare the control sample and target system (0.75 wt. % TTC-acrylate copolymer, TTC-75) required UV exposure time of 6 hours. Healing was observed on the surface of the target system, but not on the control sample.

The example shows that healing is possible for TTC-acrylate copolymer thin films, since marring is no longer visible on the surface of the film after UV exposure.

Example 3

In order to improve healing efficiency, photoinitiators were incorporated into the samples. Initial investigation used Irgacure® 1173 and a control PMMA resin. 1 wt. % photoinitiator was incorporated through both extrusion and directly into compression molding. Extruded samples were also compression molded into thin films for comparison. The optical properties of the materials did not change drastically when incorporating photoinitiators (Table 3).

TABLE 3

Optical measurements for thin films of PMMA controls with photoinitiators

| Sample | YI | ΔE | TLT | Haze |
|---|---|---|---|---|
| Extruded PMMA | 1.82 | — | 90.4 ± 0.11 | 7.0 ± 1.00 |
| Extruded PMMA with Irgacure ® 1173 | 1.62 | 0.376 | 90.8 ± 0.14 | 4.5 ± 0.64 |
| PMMA resin | 0.88 | — | 92.8 ± 0.18 | 2.9 ± 0.37 |
| PMMA resin with Irgacure ® 1173 | 0.91 | 0.114 | 92.8 ± 0.15 | 3.6 ± 0.69 |

Figure 2:
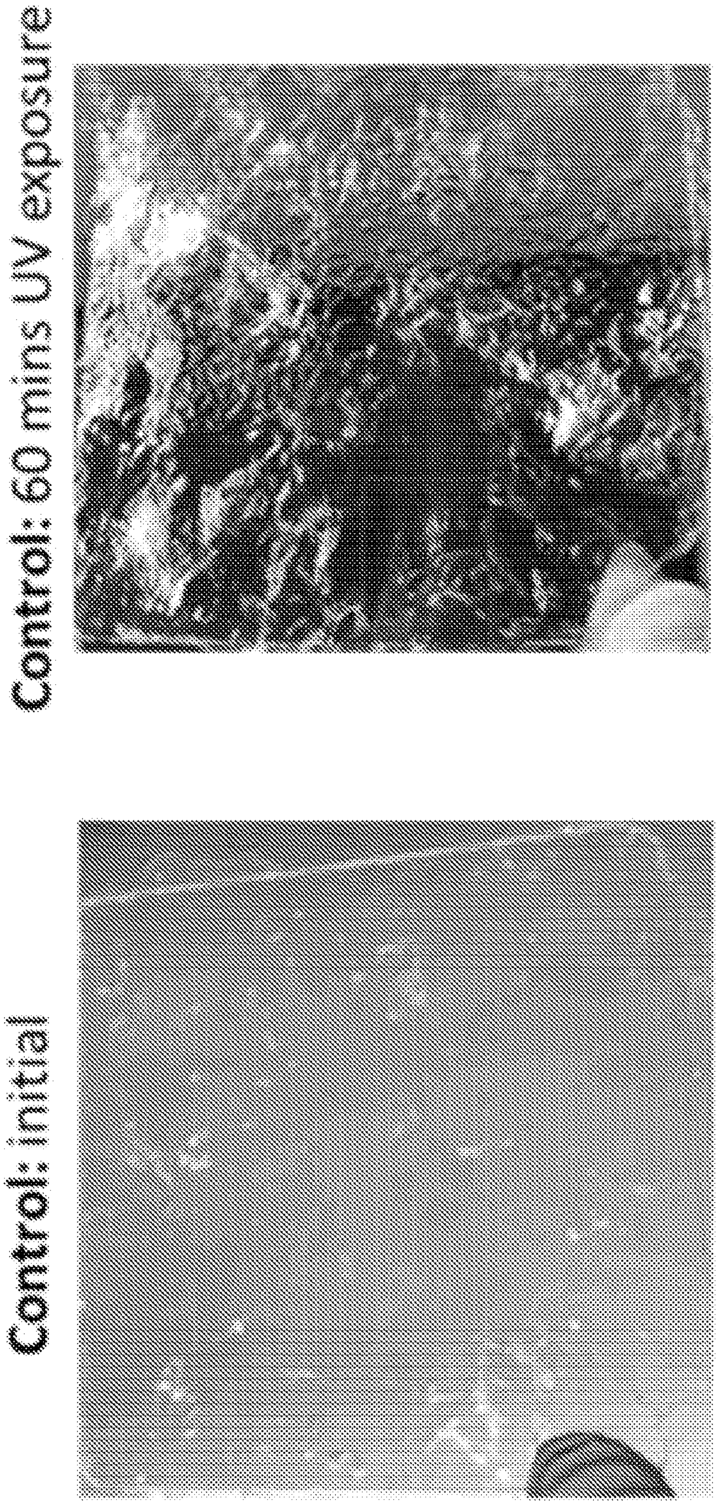
FIG. 2: shows a PMMA polymer not according to the invention with Irgacure® 1173 before and after UV exposure.
Figure 3:
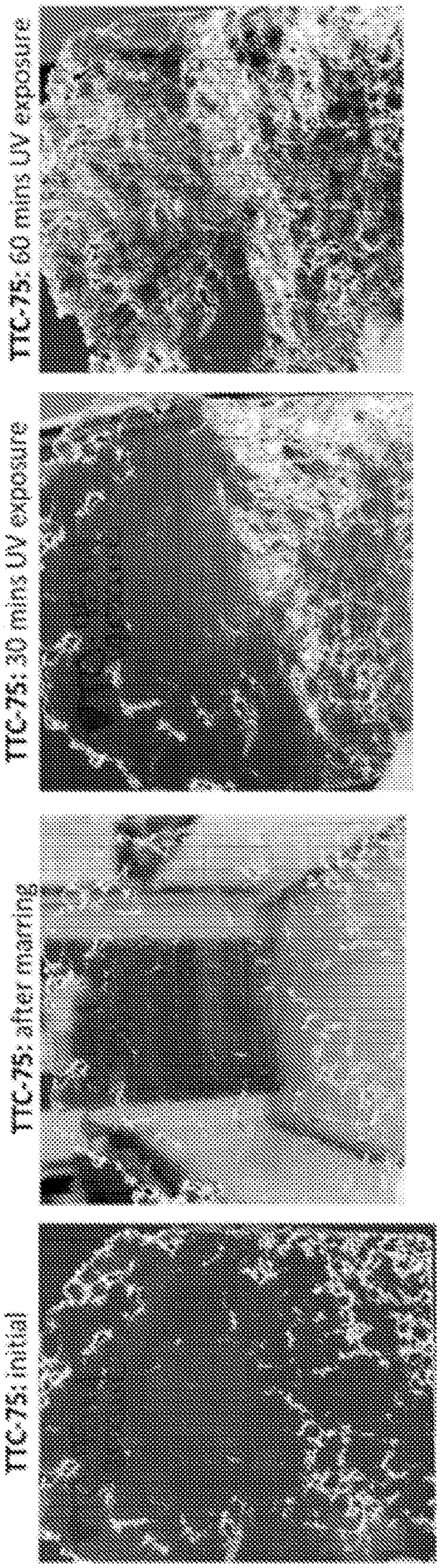
FIG. 3 shows a 0.75 wt. % TTC-acrylate copolymer according to an embodiment of the invention with Irgacure® 1173 before and after UV exposure.

The next step with the photoinitiators was to incorporate them into the target system and test for healing properties. Control and 0.75 wt. % TTC-acrylate copolymer thin films (0.03 in thickness) were marred and then placed under the UV lamp at 2.75 inch distance for 60 minutes total. Samples were checked at 30 minutes to reveal that the thin films had warped, but healing had not occurred. Samples were left under UV exposure for another 30 minutes. Marring was still visible for the control PMMA thin film (FIG. 2), but was no longer present on the 0.75 wt. % TTC-acrylate copolymer thin film (FIG. 3).

What is claimed is:

1. A copolymer composition comprising:

a) a copolymer comprising:

1) at least one thio-functional monomer comprising trithiocarbonate (TTC)-acrylate, wherein said thio-functional monomer units comprise from 0.25 to 30 wt % of the total copolymer a); and 2) one or more other ethylenically unsaturated monomer units; and b) optionally one or more additives.

2. The copolymer composition of claim 1, wherein said 1) thio-functional monomer units comprise from 0.5 to 30 wt. % of the total copolymer a).

3. The copolymer composition of claim 1, wherein the one or more ethylenically unsaturated monomer units 2) comprise at least one of (meth)acrylates; styrene; alpha methyl styrene; acrylonitrile; an olefin; ethylene; propylene; butylene; vinyl chloride; vinyl acetate; vinyl esters; vinyl ethers; butadiene; chloroprene; isoprene, or mixtures thereof.

4. The copolymer composition of claim 3, wherein said one or more ethylenically unsaturated monomer units 2) comprise (meth)acrylic monomer units.

5. The copolymer composition of claim 4, wherein said (meth)acrylic monomer units comprise from 51 to 100 wt. % of methyl methacrylate monomer units, based on the total weight of the (meth)acrylic monomer units in the copolymer a).

6. The copolymer composition of claim 1, further comprising one or more additives comprising at least one of impact modifiers; stabilizers; plasticizers; fillers; coloring agents; pigments; antioxidants; antistatic agents; surfactants; toner; refractive index matching additives; additives with specific light diffraction, light absorbing, or light reflection characteristics; or dispersing aids.

7. A composition comprising the copolymer composition of claim 1, further comprising a vinyl polymer, wherein the vinyl polymer does not comprise the thio-functional monomer units 1) as polymerized monomers.

8. The composition of claim 7, comprising from 0.1 to 90 wt. % of the thio-functional copolymer based on a total weight of polymers in the composition.

9. The composition of claim 7, wherein said vinyl polymer is an all-acrylic polymer comprising from 51 to 99.9 wt. % of methyl methacrylate monomer units; and from 0.1 to 49 wt. % of one or more other (meth)acrylic monomers, wherein the other (meth) acrylic monomers comprise at least one of methyl acrylate, ethyl acrylate, ethyl methacrylate, butyl acrylate, butyl methacrylate, iso-octyl methacrylate, iso-octyl acrylate, lauryl acrylate, lauryl methacrylate, stearyl acrylate, stearyl methacrylate, isobornyl acrylate, isobornyl methacrylate, methoxy ethyl acrylate, methoxy methacrylate, 2-ethoxy ethyl acrylate, 2-ethoxy ethyl methacrylate, dimethylamino ethyl acrylate, dimethylamino ethyl methacrylate, alkyl (meth) acrylic acids, methacrylic acid, acrylic acid, or combinations thereof.

10. A process for providing a healable article, comprising the steps of:

a) forming an article, profile, a film, a sheet, or a coating comprising the composition of claim 1, b) exposing a surface of the article, profile, film, sheet or coating to environmental forces, leaving a marred and/or scratched surface, c) exposing said marred surface to radiation for an effective period of time to allow S—S and/or S—C bonds in the copolymer a) to break and reform, healing the marred and/or scratched surface.

11. The process of claim 10, wherein said radiation is at least one of, infrared, heat, UV, visible light, x-ray radiation, gamma radiation, or electron beam radiation.

12. The process of claim 10, wherein said radiation is supplied from one or more of a Hg lamp or an LED.

13. An article of manufacture comprising the composition of claim 1, wherein said article of manufacture is a coated metal or plastic, a head light, a mold-in color (MIC) parts, a capstock, a door, a window, an automotive part, internal and exterior paneling, automotive body panels, auto body trim, recreational vehicle body panels or trims, exterior panels for recreational sporting equipment, marine equipment, exterior panels for outdoor lawn, garden and agricultural equipment and exterior paneling for marine, aerospace structures, aircraft, public transportation applications, interior paneling applications, interior automotive trims, interior panels for marine equipment, interior panels for aerospace and aircraft, interior panels for public transportation applications, or paneling for appliances, furniture, and cabinets.

* * * * *